United States Patent
Lee et al.

(10) Patent No.: US 9,070,185 B2
(45) Date of Patent: Jun. 30, 2015

(54) NOISE FILTERING METHOD AND APPARATUS CONSIDERING NOISE VARIANCE AND MOTION DETECTION

(75) Inventors: Sanghoon Lee, Seoul (KR); Sungcheol Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 663 days.

(21) Appl. No.: 13/286,409

(22) Filed: Nov. 1, 2011

(65) Prior Publication Data
US 2012/0163726 A1    Jun. 28, 2012

(30) Foreign Application Priority Data
Dec. 28, 2010   (KR) .................. 10-2010-0136959

(51) Int. Cl.
*G06K 9/40*    (2006.01)
*G06T 5/00*    (2006.01)

(52) U.S. Cl.
CPC ....... *G06T 5/002* (2013.01); *G06T 2207/20182* (2013.01)

(58) Field of Classification Search
CPC .................. G06T 2207/20182; G06T 5/002
See application file for complete search history.

(56) References Cited

U.S. PATENT DOCUMENTS

| 7,548,278 B2 | 6/2009 | Shin et al. |
| 2008/0205854 A1 | 8/2008 | Xu et al. |

FOREIGN PATENT DOCUMENTS

| JP | 2006-229749 A | 8/2006 |
| KR | 10-0695067 B1 | 3/2007 |
| KR | 10-2008-0078606 A | 8/2008 |

OTHER PUBLICATIONS

Lee, Digital Image Enhancement and Noise Filtering by Use of Local Statistics, IEEE 1980.*

* cited by examiner

*Primary Examiner* — Mark Roz
(74) *Attorney, Agent, or Firm* — Sughrue Mion, PLLC

(57) ABSTRACT

Provided herein are an apparatus and a method of performing image noise filtering with respect to an image obtained from an image sensor, the method including: applying a noise deviation with respect to a temporal difference between a previous pixel value and a current pixel value when obtaining a temporal weight value to be used in temporal filtering. The noise deviation is obtained according to an intensity level of the current pixel value. Temporal filtering and spatial filtering may be performed, and blending filtering may be selectively performed by blending an output value of the temporal filtering and an output value of the spatial filtering.

11 Claims, 6 Drawing Sheets

NOISE FILTERING METHOD AND APPARATUS CONSIDERING NOISE VARIANCE AND MOTION DETECTION

CROSS-REFERENCE TO RELATED APPLICATIONS

This application claims priority under 35 U.S.C. §119, of Korean Patent Application No. 10-2010-0136959 filed Dec. 28, 2010, the entirety of which is incorporated by reference herein in its entirety.

BACKGROUND

1. Field

Exemplary embodiments relate to processing image signals, and more particularly, relate to image noise filtering method and device capable of effectively removing a noise generated when an image is taken via a camera.

2. Description of the Related Art

In general, image devices such as a digital camera, a portable communication terminal, a still video camera, etc., are widely used for various purposes.

An image of a subject taken via a camera is captured as an electrical image signal by an image sensor. Since the electrical image signal inevitably has noise, an image signal processor includes function blocks which perform a noise removal function. The image signal processor is configured to receive and process signals from the image sensor.

If noise included in an electrical image signal is not filtered properly during an image signal processing operation, output picture quality of the image signal processor and a codec are deteriorated and coding efficiency is lowered.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment, there is provided an image noise filtering method which may include: obtaining a temporal weight based on a temporal difference of a current pixel and an adaptive noise deviation; and performing temporal filtering on the current pixel based on the temporal weight.

The image noise filtering method may further include: refining the temporal weight based on a peripheral pixel of the current pixel and other channel pixels, before the temporal filtering is performed.

A result of the temporal filtering may be blended with a result of spatial filtering.

The result of the spatial filtering may be obtained by blending a value of the current pixel and a mean value of peripheral pixels in a spatial domain using the temporal weight.

According to an aspect of an exemplary embodiment, there is provided an image noise filtering method comprising: obtaining a noise deviation according to an intensity level of a current pixel value; obtaining a temporal weight by applying the noise deviation with respect to a temporal difference between a previous pixel value and the current pixel value; performing temporal filtering by blending the current pixel value and the previous pixel value using the temporal weight; performing spatial filtering by blending the current pixel value and a mean value of peripheral pixels in a spatial domain using the temporal weight; and performing blending filtering by blending an output value of the temporal filtering and an output value of the spatial filtering.

The image noise filtering method may further include: selecting one of an output of the blending filtering and an output of the spatial filtering in response to a selection control signal.

The image noise filtering method may further include: selecting one of an output of the blending filtering, an output of the spatial filtering, and the current pixel value in response to a selection control signal.

The image noise filtering method may further include: refining the temporal weight according to a peripheral pixel of the current pixel and other channel pixels, before the temporal filtering is performed.

The image noise filtering method may further include: encoding the temporal weight when the temporal weight is stored to process a pixel on a next frame.

The image noise filtering method may further include: decoding the encoded temporal weight.

The noise deviation may vary according to a characteristic of an image sensor.

The image noise filtering method may be performed by one of a digital camera and a handheld communication terminal.

According to an aspect of an exemplary embodiment, there is provided an image noise filtering device which may include: an intensity level calculating part which calculates an intensity level of a current pixel value; a noise standard deviation calculating part which calculates a noise deviation according to the intensity level; a temporal weight value generating part which generates a temporal weight by applying the noise deviation with respect to a temporal difference between a previous pixel value and the current pixel value; and a temporal blending part which blends the current pixel value and the previous pixel value using the temporal weight.

The image noise filtering device may further include: a spatial filtering part which blends a mean value of peripheral pixels and the current pixel value in a spatial domain using the temporal weight.

The image noise filtering device may further include: a spatio-temporal blending part which blends an output value of the temporal blending part and an output value of the spatial filtering part.

According to an aspect of an exemplary embodiment, there is provided an image noise filtering device which may include: an intensity level calculating part configured to calculate an intensity level of a current pixel value; a noise standard deviation calculating part configured to calculate a noise deviation according to the intensity level; a temporal weight value generating part configured to generate a temporal weight value by applying the noise deviation with respect to a temporal difference between a previous pixel value and the current pixel value; and a temporal blending part configured to output a blending result t_out, according to a first equation: t_out=((N−w_t)*cur_pel+w_t*prev_pel)/N, wherein w_t, cur_pel, prev_pel represent the temporal weight value, the current pixel value, the previous pixel value and N total intensity levels, respectively.

The image noise filtering device may further include a spatial filtering part configured to output s_out according to a second equation: s_out=(gain*curr_pixel+(N−gain)*local_mean)/N, wherein curr_pixel, gain and local_mean represent the current pixel value, a gain value, a local mean value of peripheral pixels and the N total intensity levels, respectively.

The image noise filtering device may further include a spatio-temporal blending part configured to output st_out according to a third equation: st_out=((N−w_t)*t_out+ w_t*s_out)/N.

BRIEF DESCRIPTION OF THE FIGURES

The above and other features will become apparent from the following description with reference to the following figures, wherein like reference numerals refer to like parts throughout the various figures unless otherwise specified, and wherein.

DETAILED DESCRIPTION

The present inventive concept is described more fully hereinafter with reference to the accompanying drawings, in which embodiments of the present inventive concept are shown. The present inventive concept may, however, be embodied in many different forms and should not be construed as limited to the exemplary embodiments set forth herein. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the present inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this present inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

In figures, the same or similar reference symbols may be used to represent the same or similar constituent elements. In some figures, interconnection of elements and lines may be used to describe the present inventive concept effectively. Other elements or circuit blocks may be further provided.

Embodiments disclosed therein may include their complementary embodiments. Note that a principle of filtering a noise at temporal and spatial domains and a typical operation on image processing of an image processing unit may be skipped to prevent the present inventive concept from becoming ambiguous.

Figure 1:
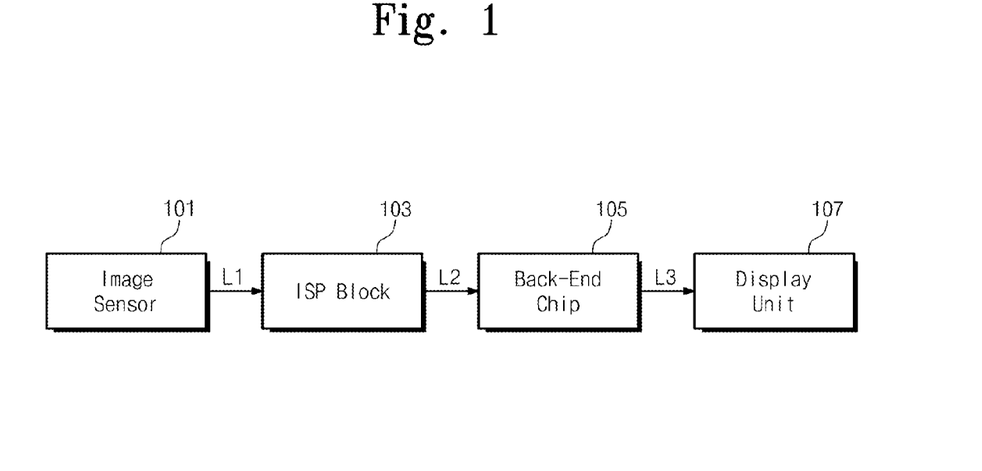
FIG. 1 is a block diagram of an image processing device according to an exemplary embodiment of the present inventive concept.

FIG. 1 is a block diagram of an image processing device according to an exemplary embodiment of the present inventive concept.

Referring to FIG. 1, an image processing device may include an image sensor 101, an image signal processor (ISP) block 103, a back-end chip 105, and a display unit 107.

The image sensor 101 may be an element which is configured to convert an optical image provided from a lens into an electrical signal. For example, the image sensor 101 may be formed of a sensor providing Bayer pattern data via a line L1. The Bayer pattern data may be data which is previously converted to a digital signal by analog to digital conversion.

The image sensor 101 may be formed of either a charge coupled device (CCD) type image sensor or a complementary metal-oxide-semiconductor (CMOS) type image sensor.

The CCD image sensor may be made commonly as a 3D CMOS image sensor (CIS) using a wafer stacking manner. According to the wafer stacking manner, an image sensor may be fabricated by forming optical integration and driver circuit portions of pixels at different wafers, respectively, and boding the different wafers. That is, the optical integration portion and the driver circuit portion are not formed simultaneously at one wafer. Bonding pads may be formed on respective wafers such that two overlapping wafers are bonded to each other. The CMOS image sensor may have an amplifier every unit cell. Since the CMOS image sensor is turned out on a mass production basis, it is possible to lower fabrication cost and power consumption and to reduce a device size, and to lower as compared with a CCD image sensor with a high voltage analog circuit.

The CMOS image sensor may have various merits as compared with the CCD image sensor. But, its sensor performance may easily become unstable at a low illumination condition and a taken image may include a noise largely. Since an amplifier is fixedly assigned every pixel, a fixed pattern noise may be caused due to characteristic differences of amplifiers. Further, a circuit for compensating for the above-described problems may be needed.

The CMOS image sensor may be disadvantageous in terms of a picture quality as compared with the CCD image sensor. For this reason, the CMOS image sensor may be applied to low-price products such as a digital camera, a digital video camera, a slow frame television camera, and the like. Recently, it is possible to design a large size of CMOS image sensor, to lower its fabrication cost, and to improve its picture quality significantly. For these reasons, the CMOS image sensor may be adopted at high-price products requiring a high picture quality like a digital single-lens reflex camera (DSLR).

Further, as compared with the CCD image sensor, the CMOS image sensor may have such merits that a driving manner is simple and various scanning manners are realized. The CMOS image sensor may further have such as merit that an analog to digital signal processing circuit is integrated within a single chip. Accordingly, it is possible to miniaturize products through a CMOS type image sensor.

The ISP block 103 may receive image data from an output line L1 of the image sensor 101 to conduct image processing operations such as color interpolation, color signal correction, gamma correction, noise filtering, and the like. The ISP block 103 may convert the image data into a YUV value to provide it to the back-end chip 105 through a line L2. In this case, image data provided to the back-end chip 105 may be data obtained by coding the YUV value.

The back-end chip 105 may store image data applied via an output line L2 of the ISP block 103 in a memory or may decode it to apply the decoded result to the display unit 107. The back-end chip 105 may send control signals for image processing to the ISP block 103.

An image processing function of the ISP block 103 may terribly affect a picture quality. In particular, a noise of an image signal may make the quality of an image greatly lower. The ISP block 103 may inevitably adopt a noise filter 250 as illustrated in FIG. 2.

Figure 2:
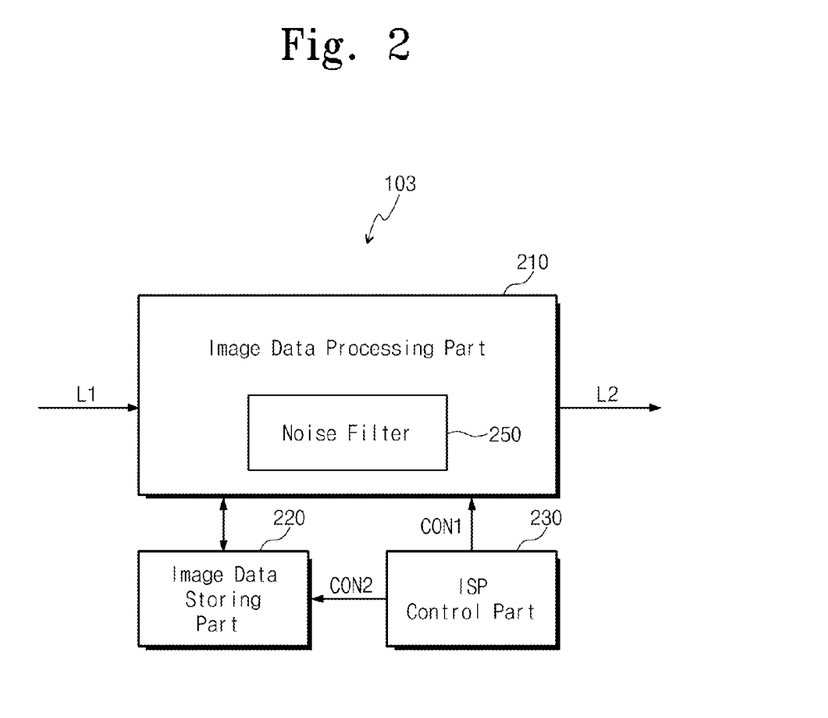
FIG. 2 is a block diagram of an image signal processor (ISP) block in FIG. 1 according to an exemplary embodiment of the present inventive concept.

FIG. 2 is a block diagram of an image signal processor (ISP) block in FIG. 1 according to an exemplary embodiment of the present inventive concept.

Referring to FIG. 2, an image signal processor (ISP) block 103 may include an image data processing part 210, an image data storing part 220, and an ISP control part 230.

The image data storing part 220 may be configured to store image data and may include a frame memory. The ISP control part 230 may be configured to control the image data processing part 210 and the image data storing part 220. The ISP control part 230 may control the image data processing part 210 via the first control line CON1 and the image data storing part 220 via the second control line CON2.

The image data processing part 210 may include a noise filter 250 for filtering an image noise. Although not shown in FIG. 2, the image data processing part 210 may typically include an ISP circuit, which can be formed of a color interpolation unit, a color correction unit for color signal correction, a gamma correction unit, automatic exposure control (AEC) unit, and the like.

The color interpolation unit may make pixel data from Bayer data, and the color correction unit may correct a color to improve and adjust a color quality. The gamma correction unit may generate an input signal proportional to the light intensity. The AEC unit may do automatic exposure control by controlling an input signal generated by the gamma correction unit.

The noise filter 250 within the image data processing part 210 may remove a noise in an image signal to better an image quality.

The noise filter 250 may typically perform 2D filtering at a spatial domain. This noise filter may be mostly formed of a low pass filter which filters a high-bandwidth noise component.

Although a noise is visually removed by the low pass filter, edge details of an object may be smoothed at the same time. This means that a sharpness of an image lowers. That is, a blur image may be obtained.

Meanwhile, noise reduction methods may be known which are executed at a temporal domain. According to a noise reduction method executed at a temporal domain, afterimage called phantom artifact may remain at an intense motion image. A motion estimation technique used for the noise reduction may necessitate a much amount of calculation. Further, since a temporal filtering weight is decided by a basic unit of motion estimation, a noise reduction performance on each pixel may be limited.

In accordance with an exemplary embodiment of the present inventive concept, the above-described problems may be solved by considering noise variance and motion detection. Further, it is possible to improve deterioration of a picture quality. A noise filter illustrated in FIG. 3 may be provided to maximize or better a noise reduction performance.

Figure 3:
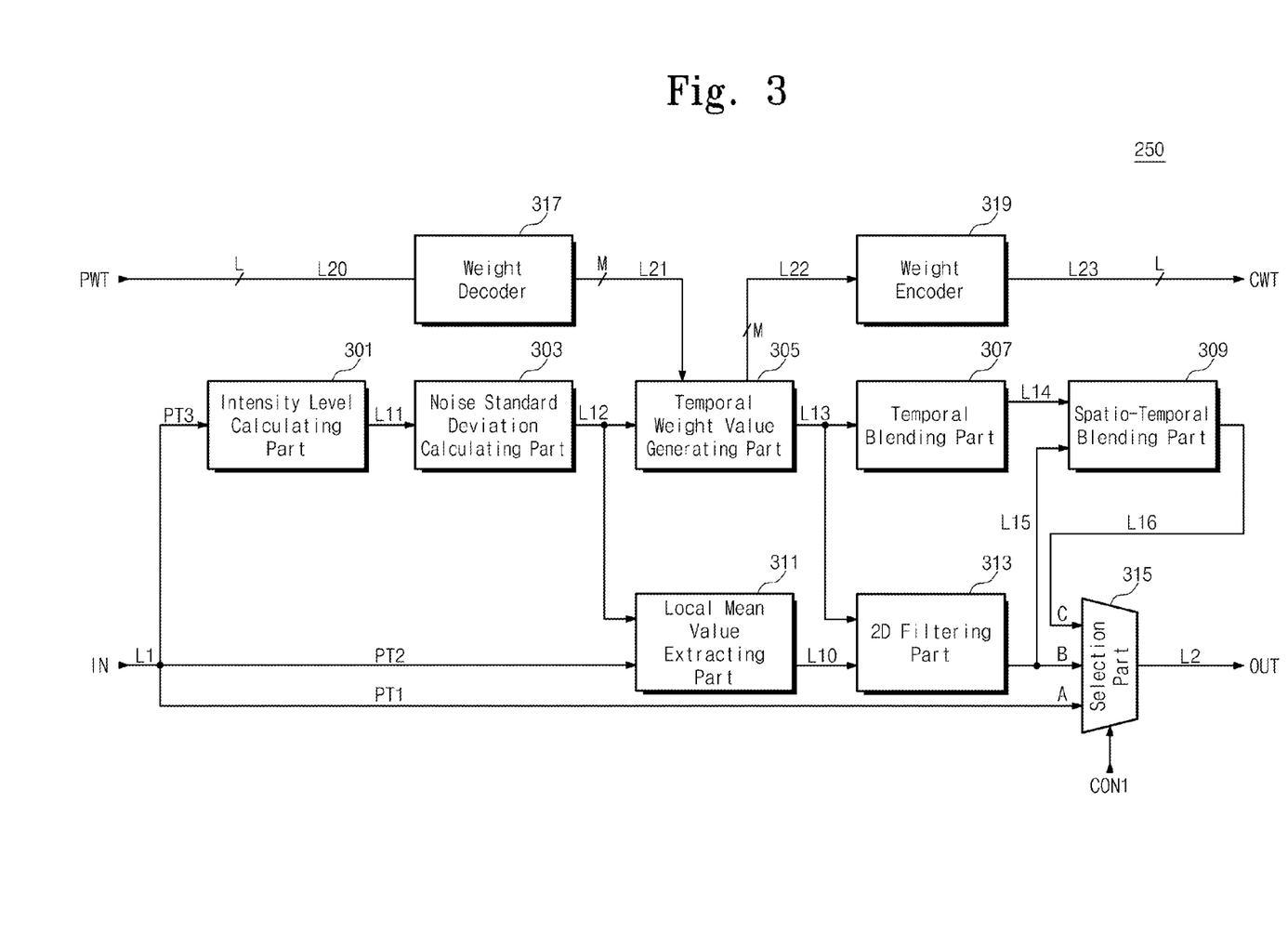
FIG. 3 is a block diagram of a noise filter in FIG. 2 according to an exemplary embodiment of the present inventive concept.

FIG. 3 is a block diagram of a noise filter in FIG. 2 according to an exemplary embodiment of the present inventive concept.

Referring to FIG. 3, the noise filter 250 may include an intensity level calculating part 301, a noise standard deviation calculating part 303, a temporal weight value generating part 305, a temporal blending part 307, a spatio-temporal blending part 309, a local mean value extracting part 311, a 2D filtering part 313, and a selection part 315. The noise filter 250 may further include a weight decoder 317 and a weight encoder 319.

In the noise filter 250 acting as an adaptive 3DNR filter, the intensity level calculation part 301 may calculate an intensity level of a current pixel value of a current frame. A standard deviation of a noise of a pixel may have large correlation with an intensity level thereof. Accordingly, it is necessary to calculate an intensity level of a pixel of which a current noise is to be removed. In this case, it is necessary to prevent an actual intensity level of a pixel from being distorted due to the noise. For this, a value applied to an FIR filter using peripheral pixels may be used as an intensity level of a current pixel. Herein, pixels applied through a line L1 may be RGB Bayer pattern data.

The noise standard deviation calculation part 303 may calculate a noise deviation according to an intensity level of a current pixel value of a current frame. That is, the noise standard deviation calculating part 303 may be a block which calculates a standard deviation of a noise corresponding to an intensity level using the intensity level applied through a line L11. In this case, since image sensors have different characteristics, it is necessary to previously define a noise standard deviation according to an intensity so as to be suitable for a corresponding sensor.

Figure 4:
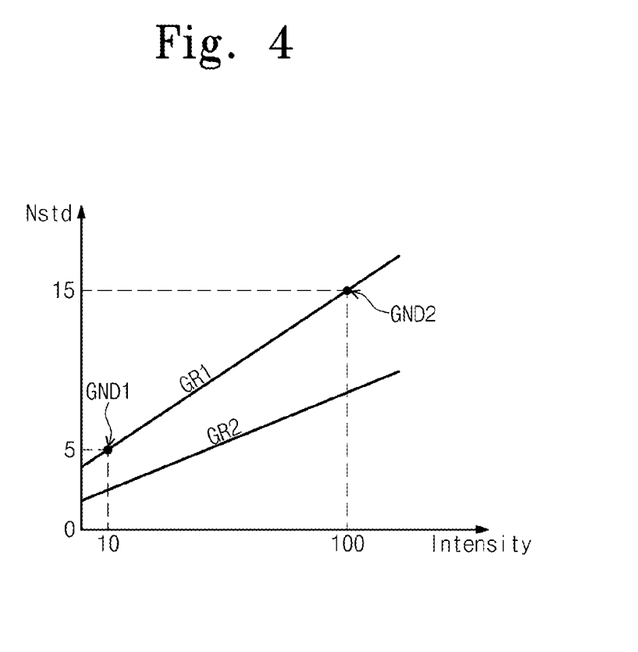
FIG. 4 is a graph showing the pixel intensity to noise standard deviation correlation of image sensors.

FIG. 4 is a graph showing the pixel intensity to noise standard deviation correlation of image sensors. In FIG. 4, a horizontal axis may represent an intensity level, and a vertical axis may represent a noise standard deviation.

Referring to FIG. 4, the first graph GR1 may represent a characteristic of an image sensor applied to a dark place as compared with the second graph GR2. A graph node GND1 may represent an intersection of an intensity level of 10 and a noise standard deviation of 5, and a graph node GND2 may represent an intersection of an intensity level of 100 and a noise standard deviation of 15. As understood from the first graph GR1, when an intensity level increases, a noise standard deviation may increase with a relatively large variation rate. As a result, a noise may be varied sensitively according to an intensity level of a pixel.

Thus, the ISP control part 230 may store values of the graphs GR1 and GR2 illustrated in FIG. 4 and may change a noise standard deviation value transferred via a line L12 according to whether a current light state is a lowlight state or a highlight state. In this case, a variation of light may be detected, for example, using a variation of an analog gain control value.

The temporal weight value generating part 305 may obtain a temporal weight value to be used at temporal filtering by applying a noise deviation with respect to a pixel intensity difference between a previous pixel value of a previous frame and a current pixel value. Upon calculating of a temporal weight value to be used at the temporal filtering, a weight value may be corrected to reduce a phantom effect due to inaccurate estimation. This correction may be accomplished by adaptively using a value of a peripheral pixel of a current pixel and a value of another channel R/Gr/Gb/B.

If the temporal difference is below the noise deviation value, a corresponding pixel may be treated as a noise, and a temporal weight value on the corresponding pixel may be increased. In this case, however, the pixel can be an edge signal having a little difference value as compared with a previous pixel. In order to prepare for this case, it is necessary to simultaneously consider intensity variance directions of peripheral pixel values, variation values of other channel values, and the like. Edge smoothing may be prevented by this consideration.

The temporal blending part 307 may do temporal filtering by blending a current pixel value and a previous pixel value using a temporal weight value which is provided from a line L13 of the temporal weight value generating part 305. A temporal blending result tout of the temporal blending part 307 may be calculated by the following equation (1) under the condition of 0 to 16 levels.

$$t\_out=((16-w\_t)*cur\_pel+w\_t*prev\_pel)/16 \qquad (1)$$

Herein, w_t, cur_pel, prev_pel may represent a weight value, a current pixel value, and a previous pixel value, respectively. It is understood from the equation (1) that a previous pixel value is reflected largely when a noise value increases.

The local mean value extracting part 311 may calculate an average/mean value of peripheral pixels at a spatial domain.

The 2D filtering part 313 may conduct spatial filtering by blending an average value of peripheral pixels and a current pixel value at a spatial domain using a temporal weight value applied through a line L13. Upon 2D filtering, the 2D filtering part 313 may refer to a noise standard deviation from the temporal weight value generating part 305 or the temporal weight value. A final output s_out of the 2D filtering part 313 may be determined by the following equation (2) by blending a current pixel value and a local mean value of peripheral pixels.

$$s\_out=(gain*curr\_pixel+(16-gain)*local\_mean)/16 \qquad (2)$$

If a temporal weight value lowers below a threshold value upon adaptive blending of a current pixel value and a peripheral pixel value, a gain may be adjusted to prevent a noise flicker phenomenon.

The spatio-temporal blending part 309 may do blending filtering by blending a temporal filtering output value applied through a line L14 and a spatial filtering output value applied through a line L15. An output st_out of the spatio-temporal blending part 309 may be calculated by the following equation (3) and output on a line L16.

$$st\_out=((16-w\_t)*t\_out+w\_t*s\_out)/16 \qquad (3)$$

In the event that a temporal weight value lowers below a threshold value, a noise may arise largely when a pixel value of a current frame is used almost as it is. In order to remove such noise, the spatio-temporal blending part 309 may blend a temporal filtering output value and a spatial filtering output value.

The selection part 315 may provide one of three inputs A, B, and C as an output OUT according to a selection control signal CON1. Herein, the selection control signal CON1 may be provided from the ISP control part 230 in FIG. 2.

The selection part 315 may select an input C among the three inputs A, B, and C to obtain the best quality although a calculation amount is much. Meanwhile, in the event that no noise filtering is needed, the selection part 315 may select an input B among the three inputs A, B, and C. The input B may be selected when filtering is required at a spatial domain.

The weight encoder 319 may encode an M-bit weight value provided from a line L22 into an L-bit weight value output on a line L23. The weight decoder 317 may decode an L-bit weight value provided from a line L20 into an M-bit weight value. Since image data is stored in a compression format via the weight encoder 319, memory efficiency may be improved.

To prevent a weight value from being changed sharply due to a noise, a weight value used at filtering on a pixel of a previous frame being placed at the same position may be reflected to filtering on a corresponding pixel of a current frame. In this case, to reduce a bandwidth for fetching a weight value of a previous frame, there may be adopted a manner of reducing a bit number and recovering the reduced bit number at a next frame. That is, a full resolution value may not be stored.

As understood from the above description, a noise reduction performance may be improved by make blending by a pixel by pixel basis adaptively upon removing of a camera noise.

Figure 5:
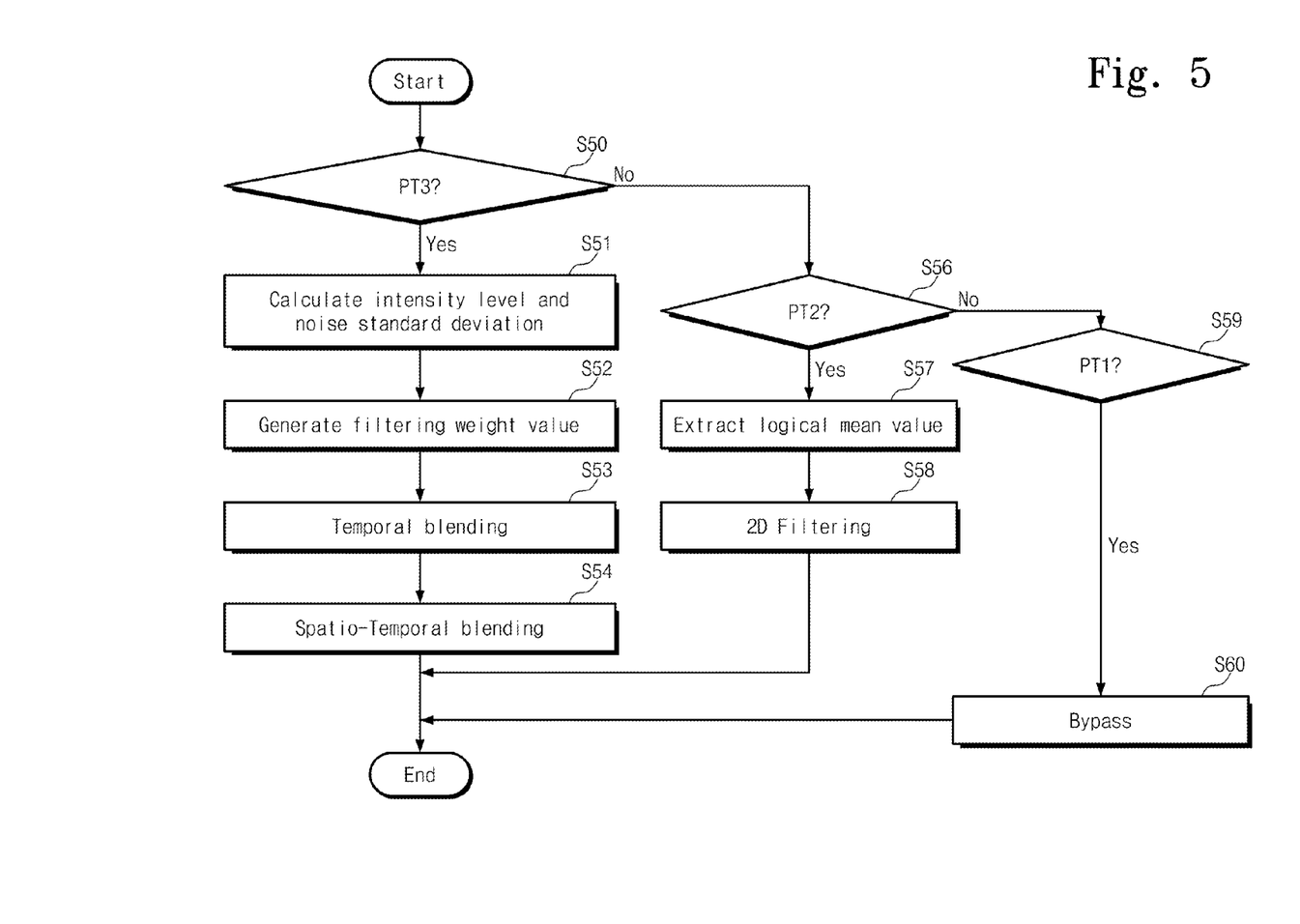
FIG. 5 is a flowchart for describing an image noise filtering process of a noise filter in FIG. 3 according to an exemplary embodiment of the present inventive concept.

FIG. 5 is a flowchart for describing an image noise filtering process of a noise filter in FIG. 3 according to an exemplary embodiment of the present inventive concept.

In operation S50, there may be checked whether the third selection mode PT3 is selected. The third selection mode PT3 may represent that noise filtering is made at both spatial and temporal domain. If the third selection mode PT3 is selected, the method proceeds to operation S51, in which an intensity level and a noise standard deviation are calculated. This may be executed by an intensity level calculating part 301 and a noise standard calculating part 303.

In operation S52, a filtering weight value may be produced by a temporal weight value generating part 305 in FIG. 5. In operation S53, temporal blending may be made. This may be executed by a temporal blending part 307 in FIG. 3.

In operation S54, a spatio-temporal filtering operation may be executed by a spatio-temporal blending part 309 in FIG. 3. In the event that the third selection mode PT3 is selected, a selection part 315 in FIG. 3 may select an input C to provide the selected input C to an output line L2.

In operation S56, there may be checked whether the second selection mode PT2 is selected. The second selection mode PT2 may represent noise filtering at a spatial domain. In operation S57, a local mean value may be extracted by a local mean value extracting part 311 in FIG. 3.

In operation S58, noise filtering of a spatial domain may be executed by a 2D filtering part 313. In a case where the second selection mode PT2 is selected, the selection part 315 may select an input B to provide it to an output line L2.

In operation S59, there may be checked whether the first selection mode PT1 is selected. The first selection mode PT1 may represent that noise filtering is bypassed. In this case, the selection part 315 in FIG. 3 may select an input A to provide it to an output line L2.

If the first selection mode PT1 is selected, the method proceeds to operation S60, in which no noise filtering is carried out at the temporal and spatial domains.

Figure 6:
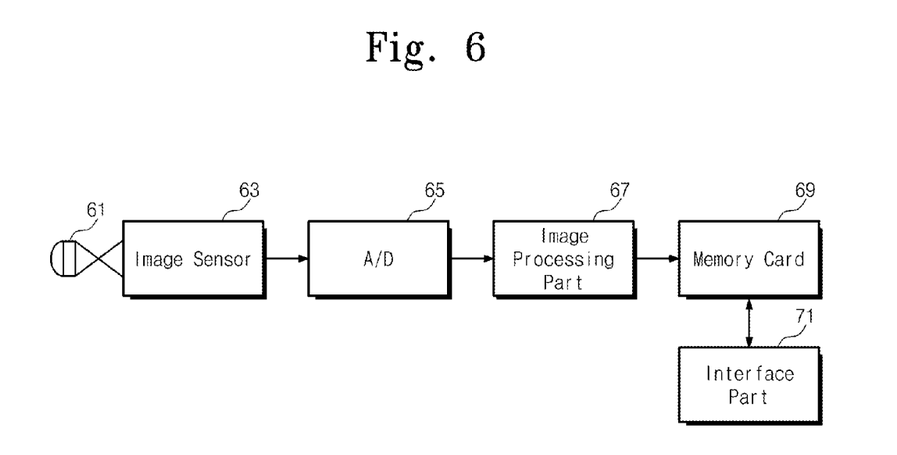
FIG. 6 is a block diagram of a digital camera according to an exemplary embodiment of the present inventive concept.

FIG. 6 is a block diagram of a digital camera according to an exemplary embodiment of the present inventive concept.

A digital camera may include a lens 61, an image sensor 63, an A/D converter 65, an image processing part 67, a memory card 69, and an interface part 71.

The lens 61 may be an optical lens of the digital camera and transfer an object image into the inside. The image sensor 63 may convert the image into an electrical signal. The A/D converter 65 may convert the electrical signal into digital data which a processor can process. The interface part 71 connected with the memory card 69 may interface with the inside or outside. For example, image data stored in the memory card 69 may be sent to the outside via the interface part 71.

The image processing part 67 may process the converted digital data so as to be suitable for histogram, sharpness, noise, exposure, intensity, color balance, and the like. In this case, the image processor part 67 may include a noise filter according to an exemplary embodiment of the present inventive concept.

The memory card 69 may include a flash memory to support a mass storage capacity. The memory card 69 may include a memory controller which is configured to overall control data exchange between a host and a flash memory. A flash memory system or memory system including this flash memory may be packed by various packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

In FIG. 6, a noise filter (refer to FIG. 3) of the image processing part 67 according to an exemplary embodiment of the present inventive concept may remove a noise generated when an image received via the lens 61 is captured by the image sensor 63.

Herein, the noise may be filtered adaptively at a spatial domain and at a temporal domain. This means that 3D noise reduction is executed more exactly. Accordingly, it is possible to improve the performance of a digital camera and to increase quality competitiveness.

Figure 7:
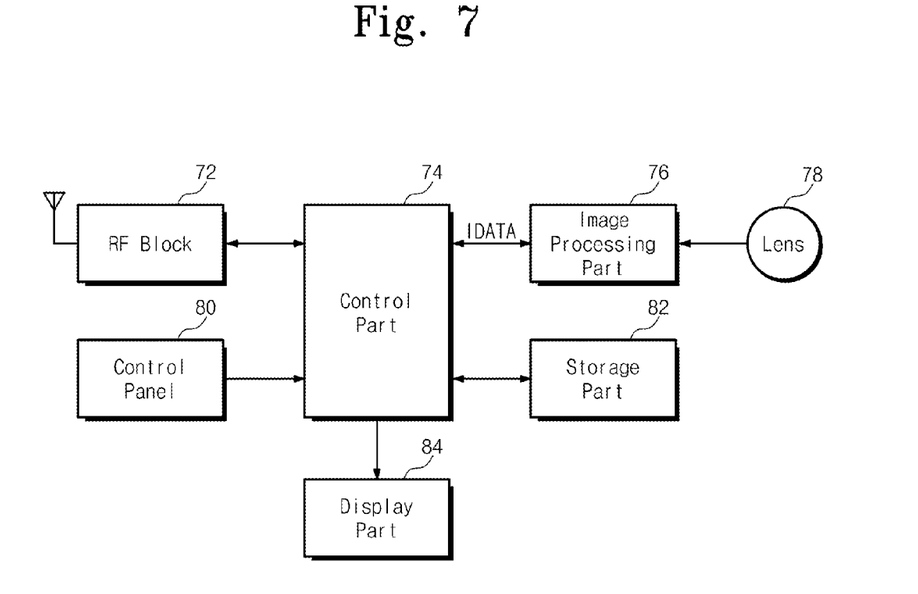
FIG. 7 is a block diagram of a handheld communication terminal according to another exemplary embodiment of the present inventive concept.

FIG. 7 is a block diagram of a handheld communication terminal according to another exemplary embodiment of the present inventive concept.

Referring to FIG. 7, a handheld communication terminal may include an RF block 72, a control panel 80, a control part 74, an image processing part 76, a lens 78, a storage part 82, and a display part 84.

The RF block 72 may be configured to receive and transmit RF communication data, and the control panel 80 may include various function keys, a 10-key, a touch pad, and the like to interface with a user. The control part 74 may control an overall operation of the handheld communication terminal according a predetermined program. The control part 74 may further include a processor of processing baseband and processor of processing applications. The image processing part 76 can be formed of an ISP block 103 in FIG. 3 according to an exemplary embodiment of the present inventive concept. The lens 78 may be a lens for a cellular phone or an attachable zoom lens. The storage part 82 may be formed of a flash memory.

The display part 84 may be formed of a touch-type LCD and configured to use an LED as its backlight.

In FIG. 7, the image processing part 76 may adopt a noise filter (refer to FIG. 3) according to an exemplary embodiment of the present inventive concept to effectively remove a noise in an image of the lens 78.

Herein, the noise may be filtered adaptively at a spatial domain and at a temporal domain. This means that 3D noise reduction is executed more exactly. Accordingly, it is possible to improve the performance of a handheld communication terminal and to increase quality competitiveness.

With the above description, it is possible to efficiently remove a noise, which is generated at image capturing of an image sensor, within an image signal processor through noise filtering considering noise variance and motion detection.

Further, a camera noise may be filtered adaptively at a spatial domain and at a temporal domain. Accordingly, in an image signal processor and a codec, deterioration of a picture quality may be improved and coding efficiency may increase.

According to an exemplary embodiment of the present inventive concept, it is possible to maximize or improve a noise reduction performance by doing blending by a pixel basis at noise filtering.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description. For example, an internal circuit block structure of a noise filter and a noise filtering method may be changed or modified variously.

What is claimed is:

1. An image noise filtering method comprising:
obtaining a temporal weight based on an adaptive noise deviation value obtained with respect to a temporal difference between a current pixel and a previous pixel;
refining the obtained temporal weight based on a peripheral pixel of the current pixel and other channel pixels; and
performing temporal filtering on the current pixel based on the refined temporal weight,
wherein an output value of the temporal filtering is blended with an output value of spatial filtering, to obtain a result of spatio-temporal filtering as a sum of the output value of the temporal filtering and a weighted difference between the output value of the spatial filtering and the output value of the temporal filtering, and
the output value of the spatial filtering is obtained by blending a value of the current pixel and a mean value of peripheral pixels in a spatial domain using the temporal weight.

2. An image noise filtering method comprising:
obtaining a noise deviation according to an intensity level of a current pixel value;
obtaining a temporal weight by applying the noise deviation with respect to a temporal difference between a previous pixel value and the current pixel value;
performing temporal filtering by blending the current pixel value and the previous pixel value using the temporal weight;
performing spatial filtering by blending the current pixel value and a mean value of peripheral pixels in a spatial domain using the temporal weight;
performing blending filtering by blending an output value of the temporal filtering and an output value of the spatial filtering; and
selecting one of an output of the blending filtering and an output of the spatial filtering in response to a selection control signal,
wherein the performing blending filtering comprises:
calculating a result of blending as a sum of the output value of the temporal filtering and a weighted difference between the output values of the spatial filtering and the temporal filtering.

3. The image noise filtering method of claim 2, further comprising:
selecting one of the output of the blending filtering, the output of the spatial filtering, and the current pixel value in response to the selection control signal.

4. The image noise filtering method of claim 2, further comprising:
refining the temporal weight according to a peripheral pixel of the current pixel and other channel pixels, before the temporal filtering is performed.

5. The image noise filtering method of claim 2, further comprising:
encoding the temporal weight when the temporal weight is stored to process a pixel on a next frame.

6. The image noise filtering method of claim 5, further comprising:
decoding the encoded temporal weight.

7. The image noise filtering method of claim 2, wherein the noise deviation varies according to a characteristic of an image sensor.

8. The image noise filtering method of claim 2, wherein the image noise filtering method is performed by one of a digital camera and a handheld communication terminal.

9. An image noise filtering device comprising:
an intensity level calculating part which calculates an intensity level of a current pixel value;
a noise standard deviation calculating part which calculates a noise deviation according to the intensity level;
a temporal weight value generating part which generates a temporal weight by applying the noise deviation with respect to a temporal difference between a previous pixel value and the current pixel value;
a temporal blending part which blends the current pixel value and the previous pixel value using the temporal weight;
a spatial filtering part which blends a mean value of peripheral pixels and the current pixel value in a spatial domain using the temporal weight; and
a spatio-temporal blending part configured to blend an output value of the temporal blending part and an output value of the spatial filtering part and calculate a result as a sum of the output value of the temporal filtering and a weighted difference between the output values of the spatial filtering and the temporal filtering.

10. The image noise filtering device of claim 9, wherein the temporal blending part is configured to calculate a result of blending of the current pixel value and the previous pixel as a sum of the current pixel value and a weighted difference between the previous pixel value and the current pixel value.

11. The image noise filtering method of claim 1, wherein the obtaining the temporal weight comprises:
determining noise deviation curves which define relationships between pixel intensity values and a standard noise deviation for different lighting conditions;
storing data corresponding to the noise deviation curves which differ from one another in correspondence with the different lighting conditions; and
applying a different value of the standard noise deviation, with respect to an intensity value of the temporal difference between the current pixel and the previous pixel, by using the stored data of the noise deviation curves.

* * * * *